3,260,766
PROCESS FOR TREATING OLEFIN MONOMERS

Walter Nudenberg, West Caldwell, and Edward A. Delaney, Morris Plains, N.J., assignors to Texas-U.S. Chemical Company, Port Neches, Tex., a corporation of Delaware
No Drawing. Filed May 20, 1963, Ser. No. 281,808
16 Claims. (Cl. 260—677)

This invention relates to a process for preparing polymerization grade olefin monomers. More particularly, this invention involves a process for producing polymerization grade olefin monomers of low moisture, carbonyl and acetylene contents.

One of the prime requirements for monomers suitable for solution polymerization is that they be moisture free and have low carbonyl and acetylene contents. Moisture, carbonyl compounds and acetylene compounds, usually vinyl acetylene and simple alpha acetylenes all act as poisons in solution polymerization. In emulsion polymerization, acetylene compounds and carbonyl compounds are also undesirable because they act as gel formers and polymerization inhibitors. Olefinic monomers such as butadiene, isoprene, 2-chlorobutadiene, styrene, ethylene and propylene usually contain carbonyl and acetylenic impurities and this invention is particularly concerned with the purification of these monomers.

Crude butadiene recovered from butane cracking contains between 1100 and 2000 p.p.m. of acetylenes and 280 to 8000 p.p.m. of carbonyl compounds and is usually saturated with water. Standard polymerization grade butadiene currently contains 250 to 470 p.p.m. of acetylenes calculated as vinyl acetylene and 70 p.p.m. of carbonyl compounds. The carbonyls and acetylene compounds are removed from crude butadiene in most commercial units by azeotropic distillation. Because of current demands to reduce acetylene levels, industry has been turning to other techniques for treating crude monomer streams. Representative new procedures are contact with N-methyl pyrrolidone, aqueous cuprous ammonium acetate or molecular sieves and controlled catalytic hydrogenation whereby acetylenes are selectively hydrogenated. Drying of the butadiene to the requisite level of 10 p.p.m. of moisture maximum for use in solution polymerization is effected by treatment of the monomer with drying agents such as alumina or molecular sieves.

The process of this invention reduces the moisture, carbonyl and acetylene contents of olefinic monomers to the levels required for polymerization, particularly for homogeneous solution polymerization, by contact with a single extracting solvent. In accordance with this invention, high purity olefinic monomers of reduced moisture, carbonyl and acetylene content are produced by extraction of olefin monomer-containing hydrocarbon stream with an anhydrous aliphatic hydrocarbon solvent which contains at least two hydroxy or amino radicals or mixtures thereof substituted thereon and which contains a dissolved cuprous salt. Anhydrides and polyamines of the hydrophilic-substituted aliphatic hydrocarbon solvent are also usable. The raffinate from the extraction with the cuprous salt-containing anhydrous hydrophilic radical substituted hydrocarbon solvent is a monomer-containing stream having a moisture content of 5 p.p.m. and below, an acetylene content below 400 p.p.m. and a carbonyl content below 50 p.p.m. The anhydrous cuprous salt containing extractant advantageously also contains a nitrite salt dissolved therein which has the dual effect of enhancing the removal of carbonyl and acetylene contaminants and of preventing undesirable polymerization of the monomer.

Contact of the olefinic monomer with the anhydrous cuprous salt solution can be effected batchwise or continuously and can involve either liquid-liquid contact wherein the monomer is maintained in the liquid state during contact or can involve liquid-vapor contact in which the monomer in vapor phase is subjected to contact with the liquid anhydrous cuprous salt solution.

The process of this invention has the advantage over prior art processes that the three major impurities, namely, moisture, carbonyl compounds and acetylene, are removed in a single operation. Contact of a butadiene stream with an anhydrous solvent containing a dissolved cuprous salt results in removal of as high as 98% of the acetylene contaminants and 90–98% of the carbonyl compounds and reduces the moisture content to 5 p.p.m. or below.

Another advantage of the purification process of this invention is that the cuprous salt containing anhydrous extractant is readily regenerated by a number of simple techniques. One procedure involves heating the spent extracting solution to between 50 and 150° C. while purging with an inert gas such as methane, L.P.G. and nitrogen. Another regeneration procedure involves evacuating the spent extracting solution to 1–50 mm. of mercury at ambient temperature. A third procedure involves slowly passing an inert gas through the spent solvent at ambient temperature. The cuprous salt solution regenerated by any of these procedures is restored to an extracting effectiveness approximating the magnitude of a freshly prepared extracting solution.

The process of this invention is effective in producing polymerization grade mono- and di-olefin monomers. Moisture, carbonyl compounds and acetylene compounds are removed from monoolefins such as isobutylene, propylene, butene-2, styrene and ethylene and from diolefins such as butadiene, isoprene and 2-chlorobutadiene by extraction with a cuprous salt-containing anhydrous hydroxy- and/or amino-substituted hydrocarbon solvent. In addition to being effective in the removal of moisture, carbonyls and acetylenes from streams consisting essentially of the olefin monomer, it is also effective in removing these contaminants from a hydrocarbon stream containing olefin monomer in admixture with other hydrocarbons. An example of such a product is a butadiene stream containing about 40 weight percent butadiene and containing substantial quantities of isobutene, butene-1, butene-2 and n-butane which is obtained as an intermediate product in butadiene manufacture and which may be used in polybutadiene manufacture. The process of the invention finds particular usefulness in the purification of butadiene for use in the manufacture of cis-polybutadiene.

The anhydrous solvent employed in the process of this invention is broadly described as a $C_2$ or higher aliphatic hydrocarbon which contains (1) at least two hydroxy or amino radicals or (2) at least one hydroxy and one amino radical or (3) contains an oxy and amino radical in a heterocyclic nucleus. This description broadly includes glycols, polyglycols, polyamines, alkanolamines and heterocyclic amines such as morpholine. Most of these compounds are immiscible with hydrocarbon streams containing olefinic monomers such as butadiene, styrene, isoprene, ethylene, propylene and 2-chlorobutadiene and are characterized by adequate solubility for cuprous salts and nitrite salts.

Polyhydroxy compounds are exemplified by glycols such as ethylene glycol, propylene glycol, butylene glycol and polyoxyalkylene glycols such as diethylene glycol, triethylene glycol, dipropylene glycol, tripropylene glycol and tetraethylene glycol; polyoxyalkylene glycols are anhydrides of glycols. Other effective polyhydroxy compounds are 1,5-pentanediol, glycerine, pentaerythritol, 1,6-hexanediol and trimethylolpropane.

Effective alkanolamines are exemplified by ethanolamine, diethanolamine, propanolamine, diisopropanolamine, triethanolamine and butanolamine. Heterocyclic amines containing an oxy atom and an amino radical in the heterocyclic nucleus such as morpholine, 2-morpholino ethanol and 1-methylmorpholine are anhydrides of alkanolamines and can be used in the process of the invention.

Polyamines which can be used as anhydrous solvents include ethylene diamine, diethylene triamine, triethylene tetramine, propylene diamine and dipropylene triamine.

The anhydrous solvent containing a plurality of hydrophilic hydroxy and amine groups usually contains 2 to 8 carbon atoms. An upper limit of 10 carbons is placed on the solvent because compounds with a greater number of carbon atoms either are too soluble in the monomer or do not have sufficient dissolving power for the cuprous salt and the nitrite salt.

The cuprous salts dissolved in the anhydrous solvent of this invention are usually either cuprous halides, cuprous cyanates or thiocyanates, or cuprous carboxylates. Cuprous bromide, cuprous iodide, cuprous fluoride and cuprous chloride may all be used but the latter is preferred because of its cost and solubility characteristics. Effective carboxylates are cuprous acetate, cuprous ammonium acetate, cuprous propionate and cuprous pentanoate. The cuprous carboxylates, however, are not as effective as the cuprous halides and are significantly more expensive.

The cuprous salt is dissolved in the anhydrous extractant in a concentration between 0.5 and 20 weight percent with optimum results being obtained with cuprous salt concentrations between 2 and 12 weight percent of the extracting solution. Concentrations above 20 weight percent of cuprous salt can be employed if the solvent has adequate solubility for the cuprous compound but such high concentrations only create handling problems without commensurate improvement in extraction effectiveness.

A preferred dosage of the cuprous salt containing anhydrous solvent for once-through treatments varies between 0.3 to 3.0 parts by weight of solvent per part by weight of olefin monomer. The weight ratio of extractant to olefin treated depends to a great extent on the type of contact employed. In batch type operations characterized by relatively inefficient contact, higher ratios of solvent to monomer are employed whereas continuous countercurrent extraction of the liquid-liquid type or of liquid-vapor type utilizes smaller dosages because of their greater contacting efficiency.

The nitrite salts which are advantageously added to the cuprous salt containing anhydrous extractant comprise alkali metal nitrites, organic ammonium nitrites and alkaline earth metal nitrites. Sodium nitrite is the preferred nitrite salt but potassium nitrite, lithium nitrite, cyclohexyl ammonium nitrite and calcium nitrite all possess polymerization inhibiting properties and may be used with the cuprous salt containing anhydrous extractant.

The nitrite salt is dissolved in the cuprous salt containing extractant in a concentration between 0.5 and 4 weight percent with 1% generally being employed.

The extraction of the olefin monomer is usually effected at a temperature between 10 and 120° C. with temperatures between 20 and 70° C. being preferred. The temperature at which the extraction is effected is not critical but it has been discovered that temperatures within the preferred range result in a more efficient removal of vinyl acetylenes from the monomer solution. The upper temperature limit for the extraction step is primarily determined by the thermal stability of the monomer and of the extractant mixture, and the boiling point of the anhydrous solvent which must be maintained in the liquid phase.

The extraction process is effected at pressures varying from subatmospheric to 500 and higher p.s.i.g. but is usually effected at pressures between atmospheric and 100 p.s.i.g.

The process of the invention is illustrated in the following examples:

EXAMPLE 1

250 grams of crude butadiene containing 1120 p.p.m. of acetylenes measured as vinyl acetylene were shaken in a stoppered bottle for 16 hours with 200 grams of the extracting solution. Some of the extracting solutions shown in Table I contained 1% sodium nitrite, as indicated, dissolved therein.

*Table I*

EFFECTIVENESS OF CUPROUS SALT ANHYDROUS EXTRACTANTS IN PURIFYING CRUDE BUTADIENE

| Extractant | Acetylene Content After Extraction, p.p.m. | Percent Reduction in Acetylenes |
|---|---|---|
| Isopropanolamine | 858 | 23 |
| Isopropanolamine containing 1% sodium nitrite | 858 | 23 |
| Isopropanolamine containing 1% each cuprous chloride and sodium nitrite | 529 | 53 |
| Isopropanolamine containing 2% cuprous chloride | 349 | 69 |
| Isopropanolamine containing 7.3% cuprous chloride | 51 | 95 |
| Isopropanolamine containing 11% cuprous chloride | 22 | 98 |
| Ethanolamine | 937 | 16 |
| Ethanolamine containing 2% cuprous chloride | 358 | 68 |
| Ethanolamine containing 8.9% cuprous chloride | 57 | 95 |
| Ethanolamine containing 14% cuprous chloride | 16 | 99 |

The butadiene products separated from the anhydrous solvents in the above example had a moisture content less than 5 p.p.m. and showed a carbonyl reduction of 90% from the 6890 p.p.m. carbonyl content of the crude stream. The data shown in Table I demonstrate the effectiveness of cuprous chloride-containing anhydrous alkanolamine solutions in removing acetylene and carbonyl compound impurities and in drying a crude butadiene stream.

EXAMPLE 2

In order to demonstrate the fact that the extraction process of the invention does not require long contact times, a series of experiments were set up in which anhydrous isopropanolamine solution containing 7.3 weight percent (3 mol percent) of cuprous chloride as the extracting solvent was contacted with a sample of crude butadiene for different contact times. In each of the following experiments 1524 grams of crude butadiene containing 1022 p.p.m. of acetylenes were stirred vigorously at 25° C. with 460 grams of the above-described extractant. Samples were withdrawn after various periods of time and analyzed for acetylene content. The results of this series of experiments are shown in Table II.

*Table II*

EFFECT OF CONTACT TIME ON EFFECTIVENESS OF ACETYLENE REMOVAL FROM CRUDE BUTADIENE

| Contact Time | Acetylene Content of Treated Product, p.p.m. | Percent Acetylene Reduction |
|---|---|---|
| 1 min | 298 | 71.0 |
| 5 mins | 302 | 70.5 |
| 30 mins | 278 | 72.8 |
| 60 mins | 278 | 72.8 |
| 120 mins | 279 | 72.7 |
| 18 hrs | 261 | 74.5 |

The data in the above table show that after 1 minute of stirring, 71% of the acetylenes had been removed from the crude butadiene stream and that longer periods of contact did not effect any appreciable improvement in reduction of the acetylene content.

EXAMPLE 3

This example demonstrates the effect of higher temperatures of contact on the efficiency of removing acetylenes and other contaminants from a crude butadiene stream. An extraction temperature of 50° C. rather than the 20–25° C. of the previous examples was employed. An extracting solution was prepared by adding 119 grams of cuprous chloride to 463.2 grams of anhydrous isopropanolamine in a clean 1 gallon glass reactor under a blanket of inert gas. After the cuprous chloride was dissolved the extracting solvent was brought to 50° C. Successive increments of crude butadiene containing 5900 p.p.m. of carbonyl compounds, calculated as acetone, and 1112 p.p.m. of acetylene compounds were added at 5 minute intervals with vigorous stirring to the reactor which was maintained at 70 to 80 p.s.i.g. The data in Table III illustrate the extractive capacity of a cuprous chloride isopropanolamine solvent at 50° C.

Table III

LIQUID-LIQUID EXTRACTION OF ACETYLENES FROM CRUDE BUTADIENE AT 50° C.

| Total weight butadiene treated | Acetylene Removed From Treated Increment, Percent | Percent Carbonyl Removal |
|---|---|---|
| 1,485 | 95.7 | |
| 2,899 | 86.7 | |
| 4,299 | 78.0 | |
| 5,735 | 63.7 | |
| 7,037 | 54.2 | |
| 8,437 | 47.9 | |
| Composite | 80 | 90 |

EXAMPLE 4

This example demonstrates the effectiveness of various anhydrous glycol, polyglycol, polyamine and alkanolamine solutions containing dissolved cuprous chloride and sodium nitrite in purifying crude butadiene streams. In all of these experiments 250 grams of crude butadiene containing 1120 p.p.m. of acetylene were shaken in a stoppered bottle with 200 grams of the extracting solution. All of the solvents shown in Table IV contained 1% sodium nitrite.

Table IV

EFFECTIVENESS OF ANHYDROUS SOLVENTS CONTAINING SODIUM NITRITE AND CUPROUS CHLORIDE IN PURIFYING BUTADIENE

| Extractant | Acetylenes in treated butadiene, p.p.m. | Percent Acetylene Reduction |
|---|---|---|
| Ethylene glycol | 1,000 | 10.5 |
| Ethylene glycol containing 1% cuprous chloride | 251 | 78.0 |
| Ethylene glycol containing 1% cupric chloride | 1,016 | 9.0 |
| Isopropanolamine | 845 | 24.0 |
| Isopropanolamine containing 1% cuprous chloride | 448 | 56.0 |
| Isopropanolamine containing 2% cuprous chloride | 349 | 69.0 |
| Diethylenetriamine | 720 | 36.0 |
| Diethylenetriamine plus 2% cuprous chloride | 403 | 64.0 |
| Triethylenetetramine | 758 | 32.0 |
| Triethylenetetramine plus 2% cuprous chloride | 274 | 76.0 |
| Diisopropanolamine | 996 | 11.0 |
| Diisopropanolamine plus 2% cuprous chloride | 226 | 80.0 |
| Morpholine | 617 | 45.0 |
| Morpholine plus 2% cuprous chloride | 246 | 78.0 |
| Ethanolamine | 937 | 16.0 |
| Ethanolamine plus 2% cuprous chloride | 358 | 68.0 |
| Diethanolamine | 1,009 | 10.0 |
| Diethanolamine plus 2% cuprous chloride | 344 | 69.0 |
| N-methyl pyrrolidone | 467 | 58.0 |
| N-methyl pyrrolidone plus 2% cuprous chloride | 432 | 61.0 |

The data clearly demonstrate the effectiveness of anhydrous glycol, alkanolamine, oxygen-containing heterocyclic amines and polyamines containing dissolved cuprous chloride and sodium nitrite in reducing the acetylene content of crude butadiene streams. The carbonyl content of the various samples is not shown in the tables since the cuprous chloride-sodium nitrite containing anhydrous solvents uniformly produce a 90% reduction in the carbonyl content of the feed butadiene. The water content of the treated butadiene was also at a uniformly low acceptable level of about 5 p.p.m.

The large reduction in the acetylene content obtained by the batch extraction of the crude butadiene with anhydrous solvents containing dissolved sodium nitrite and cuprous chloride as shown in Table IV represents a substantial advance in the purification of crude olefin monomer streams. The data in the table illustrate clearly that anhydrous glycol containing dissolved sodium nitrite effects only a relatively minor reduction of the order of 9–25 weight percent in acetylene content whereas the addition of cuprous chloride to the anhydrous sodium nitrite containing solvent results in acetylene reduction ranging from 56 to 80% in the simple batch extraction experiments shown in Table IV.

There is also included in Table IV data on the action of N-methyl pyrrolidone and N-methyl pyrrolidone containing dissolved cuprous chloride in reducing the acetylene content of the crude butadiene stream. It is significant that the extraction process of the invention employing an anhydrous glycol, alkanolamine or polyamine containing dissolved cuprous chloride is generally more effective than the commercial process using N-methyl pyrrolidone. It is also significant that the addition of cuprous chloride to N-methyl pyrrolidone effects only a minor improvement in its ability to remove acetylene from crude butadiene.

EXAMPLE 5

This example demonstrates the utility of cuprous thiocyanate for removing trace contaminants in monomer streams. Cuprous thiocyanate-isopropanolamine solution (10 mol percent of CuCNS) was prepared by dissolving 83.7 grams (.688 moles) of copper thiocyanate in 517.1 grams (6.88 mols) of isopropanolamine. Both the copper salt and the alkanolamine were rendered anhydrous before use by heating under vacuum for a period of four hours. The cuprous thiocyanate solution was prepared in a one gallon glass pressure reactor under an atmosphere of inert gas.

Contrary to the blue color observed with cuprous chloride solutions in alkanolamine, the cuprous thiocyanate solution was dark brown in color. A $C_4$ hydrocarbon stream containing approximately 40 wt. percent butadiene (this $C_4$ hydrocarbon stream had the following approximate mol percent composition: butadiene 47.8%, isobutane 0.2%, isobutene 7.3%, butene-1 22.9%, n-butane 5.9%, butene-2 15.9%), and having an acetylene content of 941 parts per million (calculated as vinyl acetylene) was treated with the cuprous thiocyanate solution at 24° C. at a pressure between 40 to 50 pounds p.s.i. Successive portions of this $C_4$ hydrocarbon stream were added to the solution and the percent acetylenes removed is shown in Table V.

Table V

| $C_4$ Stream, grams | Total Wt. $C_4$ Stream | Percent Acetylenes Removed |
|---|---|---|
| 1,664 | 1,664 | 69.6 |
| 1,383 | 3,047 | 47.7 |
| 1,465 | 4,512 | 29.9 |
| 1,456 | 5,968 | 16.0 |
| 1,508 | 7,471 | 11.1 |
| 1,494 | 8,965 | 5.4 |

The spent extractive solution remaining after removal of the treated $C_4$ stream was regenerated by (1) an inert sparge and (2) by vacuum treatment.

After complete removal of the treated $C_4$ stream by venting, argon or nitrogen was slowly sparged through a portion of the cuprous thiocyanate isopropanolamine solution. The sparging operation was continued for two hours while the reactor contents were slowly agitated and held at 24° C. and a pressure of 2 p.s.i.g.

In Table VI there are shown the results obtained on batchwise addition of successive amounts of $C_4$ hydrocarbon stream containing 40% butadiene to the cuprous thiocyanate-isopropanolamine solution treated by gas sparge. The data in Table VI show that the gas sparge effected a regeneration of the acetylene extraction ability of the cuprous thiocyanate-isopropanolamine solution.

*Table VI*

| $C_4$ Stream, grams | Total Wt. $C_4$ Stream | Percent Acetylenes Removed |
|---|---|---|
| 1,778 | 1,778 | 36.2 |
| 1,371 | 3,149 | 22.0 |
| 1,518 | 4,667 | 9.5 |

The effect of vacuum treatment on regenerating the cuprous thiocyanate-isopropanolamine solution is shown in Table VII. The vacuum regeneration treatment was carried out as follows. After venting crude butadiene, the reactor containing the cuprous salt solution was then evacuated with an oil pump at 29″ of mercury at room temperature. When an initial frothing had subsided, inert gas (argon) was sparged slowly through the solution. The vacuum treatment was maintained at 29″ of mercury for four hours. The extractive capacity of this vacuum regenerated solution is shown in Table VII.

*Table VII*

| $C_4$ Stream, grams | Total Wt. $C_4$ Stream | Percent Acetylenes Removed |
|---|---|---|
| 1,841 | 1,841 | 29.8 |
| 1,489 | 3,330 | 14.1 |
| 1,478 | 4,808 | 8.3 |

EXAMPLE 6

This example demonstrates the effect of cuprous chloride concentration in isopropanolamine on the batchwise removal of acetylenes from a $C_4$ stream containing 40% butadiene. $C_4$ hydrocarbon stream containing 941 parts per million of alpha acetylenes were stirred, on a once-through basis, in a 1 gallon reactor with cuprous chloride solutions containing the mol percentages of cuprous chloride shown in Table VIII. The batches were vigorously stirred at temperatures between 20 to 25° C. and 40 to 50 pounds pressure for 2 to 5 minutes. The $C_4$ hydrocarbon charge was then removed and analyzed for acetylenes. The results summarized in Table VIII show that the long contact times used in Example 1 are not necessary. In addition, they show the alkanolamine-salt solutions to have a greater extractive capacity than is apparent from the data in Table I. The isopropanolamine solutions used in Table VIII are as follows: 2.63 mol percent cuprous chloride was prepared from 31.88 grams of cuprous chloride dissolved in 459.8 grams of anhydrous isopropanolamine; 5 mol percent cuprous chloride was made by dissolving 65.54 grams of cuprous chloride in 497.4 grams anhydrous isopropanolamine; 9.12 mol percent cuprous chloride solution was made by dissolving 121.2 grams of cuprous chloride and 5 grams of sodium nitrite in 504 grams of anhydrous isopropanolamine solution.

*Table VIII*

| 2.63 Mol percent $Cu_2Cl_2$ | | 5 Mol percent $Cu_2Cl_2$ | | 9.12 Mol percent $Cu_2Cl_2$ | |
|---|---|---|---|---|---|
| Wt. $C_4$ Stream | Percent VA[1] Removed | Wt. $C^4$ Stream | Percent VA Removed | Wt. $C_4$ Stream | Percent VA Removed |
| 1,524 | 70.5 | 1,776 | 91.3 | 1,757 | 96.9 |
| 2,874 | 51.2 | 3,273 | 74.3 | 3,217 | 91.3 |
| 4,199 | 29.7 | 4,754 | 59.4 | 4,693 | 81.3 |
| 5,333 | 19.8 | 6,258 | 46.0 | 6,105 | 70.7 |
| 6,644 | 9.4 | 7,728 | 35.8 | 7,625 | 58.5 |
| 8,012 | 4.9 | 9,242 | 25.3 | 9,151 | 47.5 |
| 9,346 | 0.9 | | | | |

[1] VA—vinylacetylenes.

EXAMPLE 7

This example demonstrates the effect of 2 weight percent cuprous chloride-alkanolamine solutions on acetylene removal from both mono- and di-olefinic monomers other than butadiene. The experiments were run at room temperature in clean quart pop bottles under inert gas blanket. Bottles were shaken 24 hours to contact the extractant. Table IX summarizes the results observed with crude isoprene and high purity samples of isobutylene, 2-butylenes. The results observed with a $C_4$ hydrocarbon stream containing 40% butadiene are tabulated for comparison purposes.

*Table IX*

| Bottle number | A | B | C | D |
|---|---|---|---|---|
| Wt. Isopropanolamine, gms | 106.6 | 115.0 | 117.3 | 109.3 |
| $Cu_2Cl_2$, gms | 2.13 | 2.30 | 2.35 | 2.19 |
| Isoprene (Pract), gms | 135.2 | | | |
| Isobutylene (cp.), gms | | 119.4 | | |
| Butene-2 cis and trans cp., gms | | | 129.2 | |
| $C_4$ Stream, gms | | | | 123.1 |
| Orig. VA Content, p.p.m | 4,400 | 45.0 | 19.3 | 941 |
| VA Content of Raffinate, p.p.m | 2,649 | 11.4 | 9.0 | 283 |
| Percent VA Reduction | 39.6 | 74.6 | 53.4 | 69.9 |

The foregoing examples illustrate the outstanding effectiveness of cuprous salt-containing hydroxy- and/or amino-substituted hydrocarbon solvents in reducing the moisture, carbonyl and acetylene contents of olefin monomers. The process of the invention produces polymerization grade olefin monomers in one step and represents an outstanding advance in the pretreatment of such materials, particularly butadiene, prior to polymerization.

Obviously, many modifications and variations of the invention, as hereinbefore set forth, may be made without departing from the spirit and scope thereof, and therefore only such limitations should be imposed as are indicated in the appended claims.

We claim:

1. A process for preparing polymerization grade olefin monomers which comprises contacting an olefin-containing hydrocarbon stream with an anhydrous solvent selected from the group consisting of aliphatic hydrocarbons substituted with at least two hydrophilic radicals selected from the group consisting of hydroxyl radicals, amino radicals and mixtures thereof, anhydrides and polyamines of said hydrophilic substituted aliphatic hydrocarbons, said anhydrous solvent containing a dissolved cuprous salt and separating from said anhydrous solvent a raffinate containing an olefin monomer of substantially reduced moisture, acetylene and carbonyl content.

2. A process according to claim 1 in which said anhydrous solvent contains 0.5 to 20 weight percent cuprous salt.

3. A process according to claim 1 in which said hydrophilic radical-substituted aliphatic hydrocarbon solvent contains 2–10 carbon atoms.

4. A process according to claim 1 in which contact of said olefin-containing hydrocarbon stream with said cuprous salt-containing anhydrous solvent is effected at a temperature between 10 and 120° C.

5. A process according to claim 1 in which said olefin-containing hydrocarbon stream is contacted on a once-through operation with 0.3 to 3.0 volumes of said cuprous salt-containing anhydrous solvent per volume of hydrocarbon stream.

6. A process according to claim 1 in which said anhydrous solvent contains nitrite salt dissolved therein.

7. A process according to claim 1 in which said anhydrous solvent contains 0.5 to 4 weight percent nitrite salt.

8. A process according to claim 1 in which said anhydrous solvent contains 2 to 15 weight percent cuprous halide.

9. A process according to claim 1 in which said anhydrous solvent contains 2 to 15 weight percent cuprous thiocyanate.

10. A process according to claim 1 in which said anhydrous solvent contains 0.5 to 4 weight percent sodium nitrite.

11. A process according to claim 1 in which said olefin-containing hydrocarbon stream is butadiene.

12. A process according to claim 1 in which said olefin-containing hydrocarbon stream is a $C_4$ hydrocarbon mixture containing about 40 weight percent butadiene.

13. A process according to claim 1 in which said olefin-containing hydrocarbon stream is isobutylene.

14. A process according to claim 1 in which said olefin-containing hydrocarbon stream is isoprene.

15. A process according to claim 1 in which said olefin-containing hydrocarbon stream is butene-2.

16. A process according to claim 1 in which said hydrophilic-substituted aliphatic hydrocarbon solvent is selected from the group consisting of polyhydroxy compounds, polyamines, alkanolamines and heterocyclic amines containing an oxy atom and an amino radical in the heterocyclic nucleus, said solvents containing 2–10 carbon atoms.

No references cited.

DELBERT E. GANTZ, *Primary Examiner.*

G. E. SCHMITKONS, *Assistant Examiner.*